F. HAGGETT.
AUTOMOBILE LOCK.
APPLICATION FILED FEB. 21, 1920.

1,367,381.

Patented Feb. 1, 1921.
2 SHEETS—SHEET 1.

WITNESS:
Alfred T. Bratton

INVENTOR.
Frank Haggett
BY
Victor J. Evans, ATTORNEY.

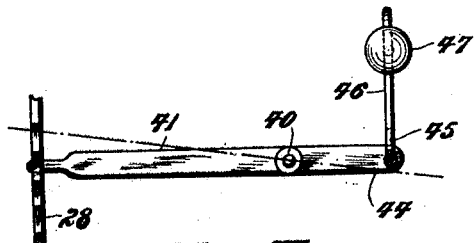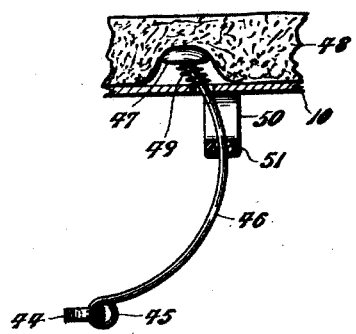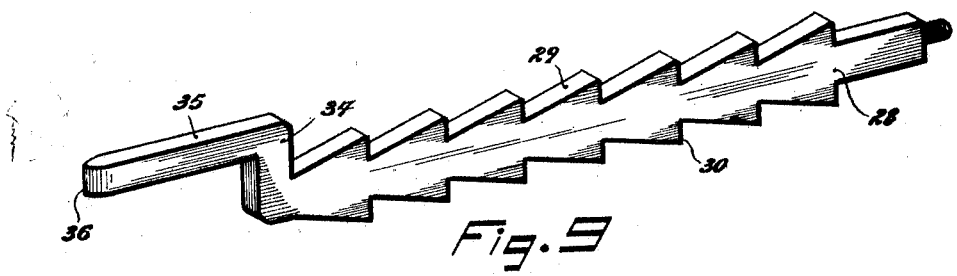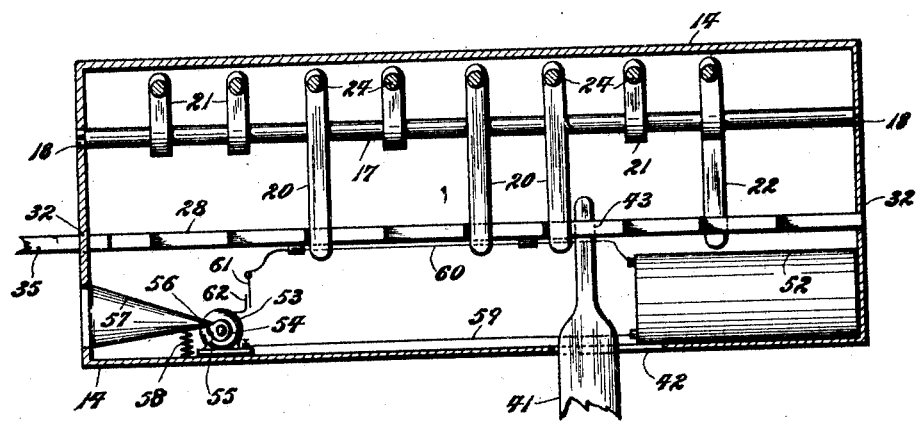

UNITED STATES PATENT OFFICE.

FRANK HAGGETT, OF PHILADELPHIA, PENNSYLVANIA, ASSIGNOR, BY DIRECT AND MESNE ASSIGNMENTS, TO THE POLICE SAFETY AUTOMATIC AUTOMOBILE LOCKING COMPANY, A CORPORATION OF DELAWARE.

AUTOMOBILE-LOCK.

1,367,381.   Specification of Letters Patent.   Patented Feb. 1, 1921.

Application filed February 21, 1920. Serial No. 360,473.

*To all whom it may concern:*

Be it known that I, FRANK HAGGETT, a citizen of the United States, residing at Philadelphia, in the county of Philadelphia and State of Pennsylvania, have invented new and useful Improvements in Automobile-Locks, of which the following is a specification.

This invention relates to locking devices and more particularly to a form or type of locking means for motor vehicles whereby tampering with the vehicle by an unauthorized person during the absence of the owner is rendered impossible.

Another object of my invention is to provide a simple and effective locking means for motor vehicles which can be easily and quickly installed and when so installed is not liable to get out of order or be easily damaged and thereby rendered inoperative.

A still further object of my invention is to provide a locking means for ready application to and association with the clutch operating pedal or lever whereby when the machine is left unattended said clutch operating pedal or lever is automatically locked against movement.

With the foregoing and other objects in view as will be hereinafter explained my invention consists essentially in the novel features of construction, combination and arrangement of parts hereinafter fully described and more specifically defined by the appended claims.

In the further disclosure of the invention reference is to be had to the accompanying sheets of explanatory drawings constituting a part of this specification and in which like characters of reference designate the same or similar parts in all the views.

Figure 1:
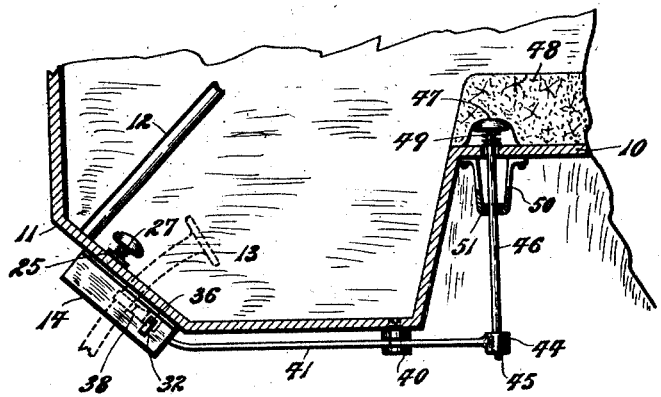

Figure 1—is a fragmentary sectional view of part of an automobile body and foot board with one convenient form of my improved locking device in position.

Figure 2:
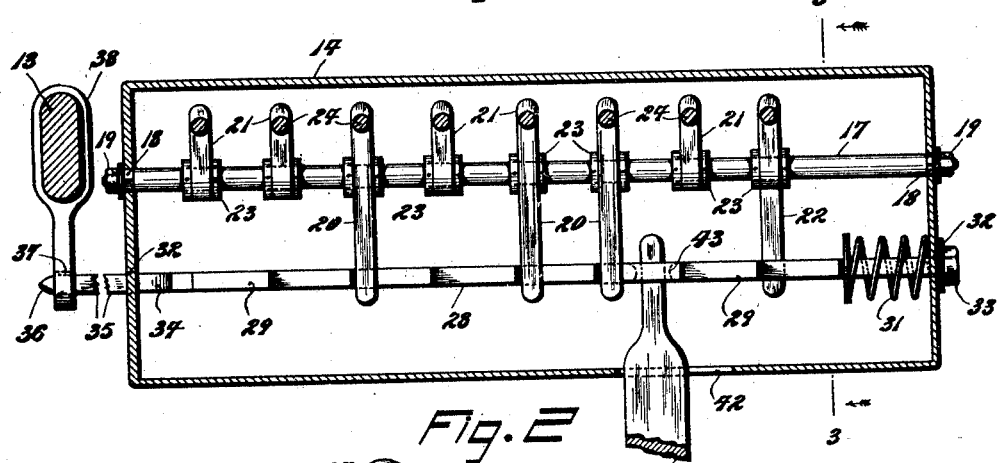

Fig. 2—is an enlarged sectional plan of the locking mechanism proper.

Figures 3, 4, 5:
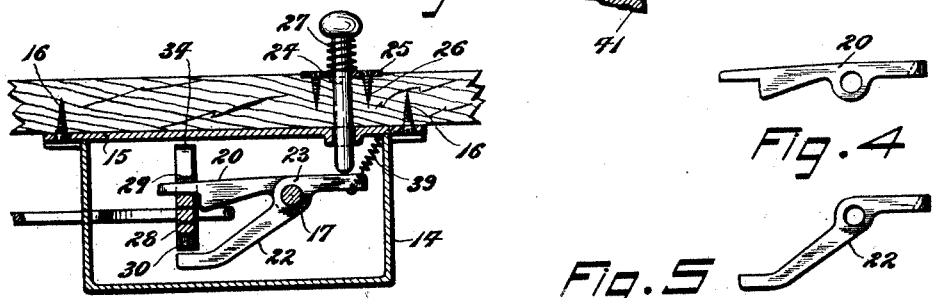

Fig. 3—is a transverse section taken approximately on the line 3—3, in Fig. 2 and looking toward the left hand thereof.

Fig. 4—is a detail of one of the locking levers.

Fig. 5—is a detail of a special or catch lever hereinafter more particularly referred to.

Figure 6:
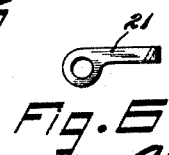

Fig. 6—is a detail of a dummy lever.

Fig. 7—is a detail plan view of the means for operating the locking mechanism.

Fig. 8—is side elevation of the same with parts broken away or in section for the sake of clearness.

Fig. 9—is a detail view of the lock bar; and

Fig. 10—is a diagrammatic plan view showing the application of my invention to an alarm signal contrivance for giving an audible indication when the mechanism is being illicitly tampered with.

According to the embodiment of my invention illustrated, and as shown in the drawings the numeral 10, designates the seat portion of an automobile body, 11, the foot board thereof, 12 a fragmentary portion of the steering post, and 13 the clutch pedal.

Appropriately secured beneath the foot board 11 is a substantially rectangular box or container 14, which is fitted with a sealed cover or lid 15, and said box is conveniently held in place by screws or bolts 16. Longitudinally of this box 14, I mount a shaft or rod 17, which is prevented from rotation by a squared end or ends 18, and it is rigidly held in adjusted position by lock nuts 19, at each end thereof. Loosely pivoted on the shaft or rod 17, are spaced fall-dogs or levers some of which designated by the numeral 20, are hereafter termed "locking" levers; others indicated by the numeral 21 are termed "dummy" levers while one characterized by the numeral 22 is called the "safety" locking lever. All of the levers 20, 21, 22, are maintained in proper position by removable collars 23 adapted for clamping engagement on the shaft 17. Each of the levers 20, 21, 22, is under the action of a spring controlled plunger or key 24, which passes through a plate 25, held down on the foot board 11 by screws 26, and each said key is encircled by a compression spring 27 which normally keeps the keys 24 raised.

Mounted in spaced relation and parallel to the shaft 17, is a longitudinally slidable lock bar 28, conveniently provided on its upper and lower edges with teeth 29, 30 respectively and said bar is fitted at one end with a compression spring 31, which normally forces the bar toward the left hand in Fig. 2. This bar 28 it is to be noted is preferably made of rectangular cross section material for passage through like shaped apertures 32, in the end walls of the box 14 so that it is prevented from rotation or any tendency to an oscillatory movement at right angles to its longitudinal axis. Lock nuts and a washer 33, are fitted at the end of the bar 28 which holds the spring 31, and at the opposite end said bar is bent or elbowed at 34, and provided with an extension 35 terminating in a pointed portion 36, which enters the eyed part 37, of a strap member 38, adapted for secure fixture on the aforesaid clutch pedal lever 13, when said pedal lever is in the normal position, that is to say when the clutch is out of gear. Recoil springs 39 are, or may be attached to each lever 20, 21, 22, for maintaining them in their normal position as well as in aiding a coöperative connection between said levers and the keys 24.

Pivotally mounted beneath the foot board 11, by a stud 40 is a lever or rod 41, the forward end whereof passes through a slot 42, in the rear wall of the box 14, and extends into engagement in a longitudinal opening 43 in the aforesaid bar 28, so that an operative connection is established for the purpose hereafter explained. The rear end of the lever 41, is provided with an eye 44, to which is hingedly connected the lever end 45, of an arcuately bent rod 46 which is provided with a head or enlargement 47, disposed beneath the cushion 48, of the seat 10. It is also to be noted that a compression spring 49, is provided about the upper end of the rod 46 and that it abuts the seat 10 and the underside of the enlargement 47 whereby the latter tends always to occupy a raised position relative to said seat and at a short distance thereabove. A bearing 50 is fitted beneath the seat 10 for the rod 46 and it is preferably formed with an antifriction or ball guide portion 51 for passage therethrough of said rod so that an easy and smooth working connection is insured.

Referring now more particularly to Fig. 10, and which illustrates the combination with my improved locking means of an alarm the numeral 52 designates a storage battery which is preferably inclosed in the box 14 and 53 indicates a small motor of appropriate size and pattern the armature shaft whereof has secured thereon a disk 54 having a projection or undulation 55 on its peripheral edge, with which is adapted to coöperate a clapper tongue or other suitable means 56 for operating a miniature form 57, which is pivoted within the box 14. A spring 58, tends to keep the tongue 56 in the path of the undulation 55 to brake its rotation. One of the conducting wires 59 is connected to one of the poles of the motor 53 while the other 60 is carried along the locking bar 28 and provided with a pendant switch member or make and break device 61 in juxtaposition to one arranged for magnetic attraction to the other pole 62, of the motor 53 when the locking mechanism occupies the locked position. Now it will be obvious that any vibration of the machine due to an attempt at its illicit starting-up when left unattended will result in the attraction of the parts 61, 62 whereby a circuit will be closed through the battery 52 to the motor 53, whereupon the latter will be set in operation and a continuous alarm given until the lock bar 28 is retracted to break the connection between the parts 61, 62.

The operation of my improved locking device for motor vehicles is as follows: Assume the various parts have been installed as above described and that there are three locking levers 20, four dummy levers 21, and one safety lever 22, all disposed relative to each other as shown, it will be obvious to those skilled in the art to which this invention appertains that the three locking levers 20 will be normally in engagement with the upper teeth 29 whereas the safety lever 22 will be out of engagement with its alining lower tooth 30. Furthermore the lock bar 28, will have its point 36 projected into the eyed part 37 of the strap 38 whereby the clutch pedal 13 is locked in the inoperative position and any attempt to move the clutch into gear until the locking levers 20 are released from engagement with the lock bar 28 will be futile. Now, when the owner of the vehicle desires to start the engine—and knowing the particular combination of levers 20 which locks the bar 28 he or she steps into the car as usual and places his or her foot on the keys 24 and depresses same which rocks the said levers 20 on the shaft or rod 17 upwardly and releases them from engagement with the teeth of the rack bar 28. On sitting down the arcuate rod 46 will be depressed by the pressure on the head 47, whereupon said rod 46 will be moved in an arcuate direction and move the lever 41, on its pivot 40 to the position shown by the dotted lines in Fig. 7 which will result in the retraction of the lock bar 28 and the removal of the projection 36 from engagement in the eyed part 37 of the strap 38. This operation will release the clutch pedal 13 whereupon the clutch can be thrown into the requisite gear, and the vehicle operated as usual, while it will be readily seen that so long as the driver remains seated the lock bar 28 will be held retracted in opposition to the spring 31. On the other hand it will be clearly understood that immediately the driver or owner gets up to leave the vehicle or car the lock bar 28 will be automatically returned to locked position. It will be also understood that the particular combination of locking levers 20 may be arranged as desired or changed relative to the dummy levers 21, and further that the safety locking lever 22 is provided so that when an unauthorized person attempts to manipulate the particular combination said lever 22 will be moved into locked position relative to the bar 28. Obviously this safety locking lever 22, may be arranged wherever desired and any attempt to release the clutch pedal 13 will be foiled as the depression of all the keys 24 will result in retaining the bar 28 firmy locked while the dummy levers 21 will further serve to complicate the solving of the particular combination necessary to release the locking mechanism.

Numerals or other appropriate markings may be furnished on the keys 24 so that the particular locking combination of levers 20 can be better memorized.

In cases where the alarm or horn 57 is provided its operation will be self evident from the description appertaining thereto, and while I have shown and described one convenient and practical embodiment of my invention and as adapted for association with the clutch pedal it is to be clearly understood that various changes and other arrangements and combinations of the several parts may be readily evolved to adapt my improvements to the many varied types and patterns of motor vehicles as well as association with some other convenient part than that specified; and it hereby is intended to include all such changes and other modifications as may reasonably be construed as falling within the scope of the appended claims.

Having described my invention, what I claim as new and desire to secure by Letters Patent, is:—

1. In a motor vehicle the combination of a locking mechanism including a movable toothed member having an extension adapted for locking engagement with the clutch operating means, a series of locking members adapted to coöperate with the toothed member to prevent its longitudinal movement when in locked position, means for releasing the locking member when desired, a safety locking lever for preventing the illicit operation of the locking mechanism, and means for moving the toothed member longitudinally when it is desired to unlock the mechanism and operate the vehicle.

2. In a motor vehicle the combination of a locking mechanism, comprising a casing, a toothed member movable longitudinally in said casing and having an extension adapted for locking engagement with the clutch pedal, a series of locking levers adapted to coöperate with the toothed member to prevent its longitudinal movement when in locked position, means for releasing the locking levers when desired, a safety locking lever for preventing the illicit operation of the locking mechanism, dummy levers and operating means therefor in combination with the locking and safety levers, and means for moving the toothed member longitudinally when it is desired to unlock the mechanism and operate the vehicle.

3. In a motor vehicle the combination of a locking mechanism, comprising a casing, a toothed member movable longitudinally in said casing and having an extension adapted for locking engagement with the clutch pedal, a series of locking levers adapted to coöperate with the toothed member to prevent its longitudinal movement when in locked position, means for releasing the locking levers when desired, a safety locking lever for preventing the illicit operation of the locking mechanism, dummy levers and operating means therefor in combination with the locking and safety levers, a pivoted lever having operative connection with the lock bar, and means for moving said pivoted lever to retract the lock bar when it is desired to operate the vehicle.

4. In a motor vehicle the combination of a locking mechanism comprising a casing, a toothed member movable longitudinally in said casing and having an extension adapted for locking engagement with the clutch pedal, a series of locking levers adapted to coöperate with the toothed member to prevent its longitudinal movement when in locked position, means for releasing the locking levers when desired, a safety locking lever for preventing the illicit operation of the locking mechanism, dummy levers and operating means therefor in combination with the locking and safety levers, a pivoted lever having operative connection with the lock bar, an arcuate rod hingedly connected to the pivoted lever remote from the lock bar and said rod terminating in a head portion located beneath the driver's seat, and means for normally raising said head portion relative to the seat when not in use.

5. In a motor vehicle the combination of a locking mechanism including a rack bar having upper and lower alining teeth and an extension adapted for locking engagement with the clutch pedal, a series of locking levers adapted for coöperation with the upper teeth of the rack bar to hold the latter in locked position, means for releasing the locking levers when desired, a safety locking lever adapted to coöperate with the lower teeth of the rack bar and thereby prevent the illicit operation of the locking mechanism, dummy levers and operating means in combination with the locking and safety levers, and means for moving the rack bar from locking to unlocked position— when the particular combination of locking levers have been released—concurrent with the driver assuming a seated position.

In testimony whereof I affix my signature.

FRANK HAGGETT.